United States Patent Office 3,755,423
Patented Aug. 28, 1973

3,755,423
PROCESS FOR PREPARING AN UNSATURATED GLYCOL DIESTER
Takeru Onoda, Yokohama, and Junzo Haji, Tokyo, Japan, assignors to Mitsubishiki Chemical Industries Limited, Tokyo, Japan
No Drawing. Filed Apr. 17, 1972, Ser. No. 244,871
Claims priority, application Japan, Apr. 17, 1971, 46/24,732; Dec. 29, 1971, 47/3,627; Feb. 7, 1972, 47/13,438
Int. Cl. C07c 67/04, 69/16, 69/74
U.S. Cl. 260—497 A                                          29 Claims

ABSTRACT OF THE DISCLOSURE

Unsaturated glycol diesters are prepared at high reaction velocities, high degrees of conversion and high selectivity, by reacting a conjugated diene, a carboxylic acid and oxygen, in the presence of a solid catalyst containing palladium, at least one element selected from the group consisting of antimony, bismuth, tellurium and selenium. Tellurium and selenium are preferred since they aid in reducing the quantity of palladium lost in the reaction medium.

BACKGROUND OF THE INVENTION

Field of the invention

The present invention relates to a process for preparing a glycol diester from a conjugated diene compound. More particularly, the present invention relates to a process for preparing an unsaturated glycol diester in high yield by reacting molecular oxygen, a conjugated diene and a carboxylic acid in the presence of a solid catalyst.

Description of prior art

Glycol compounds are used industrially as solvents, and as intermediates for the preparation of various useful compounds. These compounds have heretofore been prepared industrially by the use of acetylene in the Reppe reaction or by hydrogenation and hydrolyzation of a butenediol diester, etc. The butanediol obtained by those conventional methods is used as an intermediate for pyrolidone, or for tetrahydrofurane. It has also been used as an organic solvent.

It is known to prepare butanediol diester by a two step reaction involving halogenating butadiene to synthesize a dihalogenated butene and then converting said dihalogenated butene to butenediol diester. Another known method is to synthesize butenediol diester by passing butadiene and oxygen into an organic acid containing dissolved palladium salt and/or copper salt, in a one step reaction. Although the one-step method is industrially advantageous from the point of view of reaction velocity, it requires very complicated separation and palladium recovery procedures since the palladium salt is homogeneously dissolved in the reaction solution. Moreover, some degree of palladium loss is inevitable, so that industrial scale processing is uneconomical.

In general, the carboxylation of a conjugated diene using a palladium salt-redox catalyst system will involve predominate carboxylation of adjacent carbon atoms. That is, carboxylation of 1,3-butadiene will usually result in formation of 3,4-dicarboxy-1-butene rather than the more industrially desirable 1,4-dicarboxy-2-butene. The latter is usually only obtainable in amounts of at most 50%.

A need exists, therefore, for a method of producing glycol diesters in high yields and high selectivity which is simple and does not involve the loss of uneconomical amounts of palladium.

SUMMARY OF THE INVENTION

Accordingly, it is one object of this invention to provide an industrially advantageous process for manufacturing an unsaturated glycol diester.

It is another object of this invention to produce glycol diesters using a palladium catalyst but with reduced levels of palladium loss.

Still another object of this invention is to provide a process for producing glycol diesters in high yields and high degrees of selectivity.

These and other objects as will hereinafter become more readily apparent have been attained by reacting molecular oxygen, a carboxylic acid and a conjugated diene in the presence of a solid catalyst containing palladium and antimony, bismuth, tellurium, selenium or a mixture thereof.

DETAILED DESCRIPTION OF THE PREFERRED EMBODIMENTS

The conjugated diene which can be used in the process of the present invention may be butadiene or a hydrocarbon substituted butadiene derivative such as isoprene, 2,3-dimethylbutadiene, piperylene, etc., represented by the formula:

$$\underset{R_2}{\overset{R_1}{\diagdown}}C=C-C=C\underset{R_6}{\overset{R_5}{\diagup}}\quad\quad(1)$$
$$\phantom{XXXXX}R_3\ R_4$$

wherein $R_1$ to $R_6$ are individually a hydrogen atom or a hydrocarbon group, more preferably an alkyl group. Exemplary of suitable substituted butadienes include isoprene, 2,3-dimethylbutadiene, piperylene etc. In the case of hydrocarbon group substitution, the number of carbon atoms is preferably below 6 although it is not particularly limited. Butadiene and isoprene are preferred and butadiene is most peferred.

It is not necessary that the conjugated diene be in a purified form and it may contain inert gases such as nitrogen, etc., or a saturated hydrocarbon such as methane, ethane, butane, etc.

The carboxylic acid used may be any aliphatic, alicylic, or aromatic. Suitable carboxylic acids include, benzoic acid, cyclohexane carboxylic acid, or the like. It is industrially advantageous to use a lower aliphatic carboxylic acid such as acetic acid, propionic acid or butyric acid, etc. Acetic acid is particularly preferable, and when used the reaction proceeds as

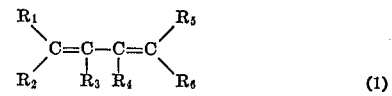

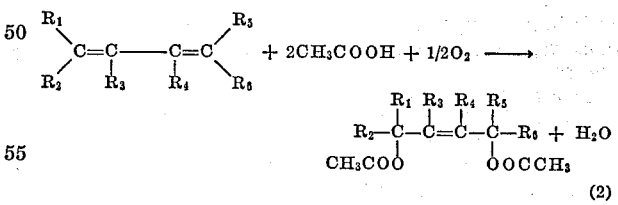

(2)

wherein $R_1$ to $R_6$ are as defined above.

The preparation of an unsaturated glycol diester according to the process of the present invention is carried out in the presence of a solid catalyst containing palladium and, in addition, antimony, bismuth, tellurium, selenium or a combination thereof. Although the reaction will proceed very slowly, when reacting a conjugating diene, a carboxylic acid and molecular oxygen in the presence of a solid catalyst containing palladium only, when antimony, bismuth, tellurium and/or selenium is also present, the reaction velocity is remarkably increased. Even when using a solid two-component catalyst containing palladium and at least one of antimony, bismuth, tellurium or selenium, a remarkably increased conversion and a high selectivity to the desired unsaturated glycol diester can be attained. However, if using a solid catalyst containing palladium and antimony and/or bismuth, the elution of palladium into the reaction medium is observed. So recovery of palladium is desirable even though the amount of palladium eluted is small. However, if the catalyst contains palladium, antimony and/or bismuth and also tellurium and/or selenium the elution of palladium into the reaction medium is remarkably decreased. In addition, by selecting the amount of tellurium and/or selenium to be added properly, the reaction velocity can be increased and also the selectivity of production of 1-4 unsaturated glycol diesters can be enhanced. When using a solid catalyst containing palladium and tellurium and/or selenium, the elution of palladium does not occur, or the degree is quite small.

The catalyst may be used in the form of an alloy composed of palladium and antimony, bismuth, tellurium and/or selenium or alternatively, the components of the catalyst may be supported on a suitable carrier.

In order to prepare a supported catalyst, ordinary preparation techniques for supporting a metallic catalyst on a carrier may be used. That is, the catalyst may be prepared by supporting an appropriate palladium compound and one or more compounds selected from antimony compounds, bismuth compounds, tellurium compounds and selenium compounds on a carrier and then subjecting the compounds to reduction conditions. These catalyst components may be easily reduced to metals by conventional techniques.

For example, the catalyst may be prepared by placing a carrier into a solution obtained by dissolving a palladium compound and an antimony compound, a bismuth compound, a tellurium compound and/or a selenium compound in an appropriate solvent, removing the solvents by distillation to deposit the above components on the carrier and, thereafter, reducing the compounds in a gaseous stream of hydrogen or other reducing agent such as hydrazine or formalin to their free metal states. The supported catalyst may also be prepared by placing a carrier into a solution of a palladium salt and an antimony salt, bismuth salt, tellurium salt and/or selenium salt, subsequently adding a precipitant such as, for example an alkali, to precipitate the components onto the carrier, and, thereafter, subjecting the components to reduction conditions as described above.

The palladium, and antimony, bismuth, tellurium and/or selenium may be simultaneously or successively supported onto the carrier.

The palladium compound used for preparing the catalyst is not especially limited, although a halogenated palladium, such as palladium chloride, an organic acid salt such as palladium acetate, palladium nitrate, palladium oxide, etc. are preferable in view of cost. However, other palladium compounds, for example sodium palladium chloride, sodium palladium sulfate, etc. can be used, of course.

In general, the concentration of palladium on the carrier is preferably within the range of 0.1 to 20%, by weight, although it can be varied over a broader range. Even if the concentration is less than 0.1%, by weight, the reaction will proceed. If the concentration is above 20%, by weight, the present reaction will still be possible, although it will involve a greater use of palladium.

Also the antimony compound, bismuth compound, tellurium compound and selenium compound used for preparing the catalyst are not especially limited, but may suitably be any of the compounding halides, nitrates, sulfides, oxides or other various compounds as is well known. For example, suitable halides include antimony chloride, bismuth chloride, tellurium (II) chloride, tellurium (IV) chloride, selenium (II) chloride and/or selenium (IV) chloride, oxides such as antimony oxide, bismuth oxide, tellurium (IV) oxide, tellurium (VI) oxide and/or selenium oxide, or bismuth nitrate, antimony sulfide, bismuth sulfide, telluric acid, ortho telluric acid, selenic acid, tellurium sulfite, seleninyl chloride, etc. are typical. If desired, also antimony metal, bismuth metal, tellurium metal and selenium metal may be used.

Although any amount of antimony and/or bismuth supported on the carrier will be effective to some degree, in general, the preferable range is 0.03 to 30%, by weight.

Generally, the ratio of antimony and/or bismuth to palladium in the catalyst is preferably 0.01 to 10 gram atoms of antimony and bismuth in total, per one gram atom of palladium. In particular, the total amount of antimony and bismuth is advantageously 0.1 to 5 gram atoms per one gram atom of palladium.

Similarly any amount of tellurium and/or selenium supported on the carrier will be effective to some degree, although the preferable range is 0.01 to 30%, by weight.

The ratio of tellurium and/or selenium to palladium in the catalyst is usually preferably 0.01 to 10 gram atoms of tellurium and selenium in total per one gram atom of palladium. In particular, the total amount of tellurium and selenium is advantageously 0.05 to 5 gram atoms per one gram atom of palladium.

Suitable carriers for use in the preparation of a supported catalyst include activated carbon, silica gel, silica-alumina, alumina clay, bauxite, magnesia, diatomaceous earth, pumice, etc.

When activated carbon is used as the carrier, if it is prior treated with an appropriate oxidizing agent, the catalytic activity will be enhanced and a 1,4 glycol diester can be produced in high yields and high degrees of selectivity. Oxygen, air, carbon dioxide, steam, nitric acid, chromic acid solution, various kinds of perhydroxy acid, peracid, etc. are appropriate oxidizing agents. The oxidation treatment of activated carbon may be carried out simultaneously with the supporting procedures for the antimony, bismuth, tellurium and/or selenium. For example, a catalyst having a similarly high activity as prior activated carbon is obtained by dissolving a palladium compound and/or the above metallic compound in an oxidizing agent such as nitric acid, impregnating the activated carbon with the resulting solution and then reducing the component to prepare the catalyst.

The reaction of conjugated diene with carboxylic acid according to the process of the present invention can be carried out by using any conventional method, such as a fixed bed type, a fluid bed type, a suspension catalyst type, etc. For example, the reaction can be easily carried out by suspending a catalyst in a reaction medium comprising a carboxylic acid, and then passing a conjugated diene and a molecular oxygen-containing gas therein. The molecular oxygen-containing gas is not necessarily pure oxygen, but may be oxygen diluted with an inert gas, e.g. air. The amount of oxygen to be used is not critical but preferably is within the range of 1 to 60 mole percent based on the total components of feed gases.

The reaction according to the process of the present invention is preferably carried out in an anhydrous state. Accordingly, water produced by the reaction is preferably removed. Such removal of water is most simply accomplished by adding an anhydride of the carboxylic acid reactant in the reaction medium. It is not desirable, however, for water to be present in the reaction medium since it lowers the reaction velocity up to about 10%, by weight, of water can be tolerated, and still larger amounts may be tolerable but only at the sacrifice of reaction velocity.

In addition to the above described carboxylic acids, acid anhydrides, carboxylates of alkali metals or alkaline earth metals, such as lithium, sodium, potassium, magnesium, calcium, etc., or inert organic solvents, e.g. saturated hydrocarbons, esters, etc., may be present in the reaction medium. The amount of carboxylic acid reactant is preferably above 50% based on the weight of reaction medium.

The reaction is usually carried out at a temperature of above 20° C. Considering the reaction velocity and production of byproducts, the preferable reaction temperature range is 60 to 180° C. The reaction pressure is not critical, but the reaction is usually carried out under atmospheric or superatmospheric pressures of up to 100 kg./cm.$^2$. Of course, it can be carried out under even higher pressures if desired.

According to the process of the present invention, a remarkably increased conversion and the high degree of selectivity to the desired product can be attained in the preparation of an unsaturated glycol diester from a conjugated diene as compared with the prior art methods. The process of the present invention is extremely advantageous as an industrial method for manufacturing an unsaturated glycol diester, since there is very little, if any, loss of expensive catalyst component so that recovery and purification after-treatment is quite easy.

The present invention will be further illustrated in detail with respect to the following examples which are presented for purposes of illustration only and are not intended to be limiting of the scope of the invention unless otherwise so specified.

The terms used in the examples are defined as follows:

3,4-DAB: 3,4-diacetoxy-1-butene;
1,4-DAB: 1,4-diacetoxy-2-butene;
t-1,4-DAB: trans-1,4-diacetoxy-2-butene;
c-1,4-DAB: cis-1,4-diacetoxy-2-butene;
1,3-DAB: 1,3-diacetoxybutene.

Each isomer of diacetoxybutene shown in the tables, after being separated by gas chromatography, was analyzed by IR spectrum and NMR spectrum and further was identified by confirming the coincidence of diacetoxybutene obtained by hydrogenation with a control sample especially synthesized, and by gas chromatography, and elemental analyses.

Example 1

50 mmoles of palladium chloride and 15 mmoles of antimony chloride were dissolved in 85 ml. of 12 N hydrochloric acid and 50 g. of 30 to 60 mesh activated carbon were added thereto and were dried slowly in a water bath. The material after drying was 60 g. in weight. 12 g. of dried material (containing 10 mmoles of palladium metal and 3 mmoles of antimony metal) were removed and dried completely in a nitrogen gas stream at 200° C. for 2 hours, and thereafter reduced in a stream of nitrogen gas saturated with methanol at room temperature at 200° C. for 2 hours and further at 400° C. for 1 hour to prepare a catalyst.

This catalyst was contacted with 2.7 moles of glacial acetic acid, 0.5 mole of acetic anhydride and 20 mmoles of lithium acetate into an autoclave of 300 ml. in content volume, which is made of glass and provided with a thermometer, a stirrer and a gas inlet. Butadiene and oxygen were introduced into the system at respective rates of 55 mmoles per hour at 80° C. for 4 hours. After cooling, the reaction product was filtered to remove the catalyst and the filtrate was concentrated to about 50 ml. under a reduced pressure of 50 mm. Hg. 100 ml. of water were added thereto and, after being allowed to stand overnight, were extracted three times with 100 ml. of benzene. The extracts were combined and washed once with 100 ml. of saturated sodium bicarbonate acqueous solution and then three times with 100 ml. of water. Thereafter the benzene extract was concentrated to about 20 ml. under reduced pressure of 100 mm. Hg, and the concentrate was subjected to gas chromatography to determine diacetoxybutenes produced. The results are shown in Table I.

Comparative Examples 1 and 2

According to the same method as in Example 1, 50 mmoles of palladium chloride were supported on 30 to 60 mesh activated carbon and 30 to 60 mesh silica gel, respectively, and reduced to form the catalyst. The same reaction as described in Example 1 was carried out using these catalysts. The results are shown in Table I.

Examples 2 to 17

According to the method as described in Example 1 catalysts differing according to type of carrier and amount of palladium or antimony supported thereon were prepared. The same reaction, as described in Example 1, was carried out using these catalysts. The results are shown in Table I.

Example 18

20 mmoles of palladium chloride were dissolved in 35 ml. of 12 N hydrochloric acid and, after adding 20 g. of 30 to 60 mesh activated carbon thereto, were evaporated slowly to dryness on a water bath, and subsequently 6 mmoles of antimony chloride dissolved in 35 ml. of 4 N hydrochloric acid were added thereto and evaporated slowly to dryness on a water bath. The material after drying weighed 24 g. 12 g. of dried material (containing 10 mmoles of palladium metal and 3 mmoles of antimony metal) were removed and reduced by the same procedure as in Example 1 to prepare a catalyst, and the same reaction as in Example 1 was carried out using this catalyst. The results are shown in Table I.

TABLE I

| No. | Carrier | Mmol Pd | Mmol Sb | Reaction time (hr.) | Product (mmol) 3,4-DAB | t-1,4-DAB | c-1,4-DAB |
|---|---|---|---|---|---|---|---|
| Comparative Example: | | | | | | | |
| 1 | 30-60 mesh activated carbon | 10 | 0 | 6 | 0.6 | 2.7 | 0 |
| 2 | 30-60 mesh silica gel | 10 | 0 | 6 | 0.2 | 2.7 | 0 |
| Example: | | | | | | | |
| 1 | 30-60 mesh activated carbon | 10 | 3 | 4 | 4.2 | 10.0 | 2.6 |
| 2 | do | 5 | 1.5 | 4 | 1.9 | 5.4 | 0.7 |
| 3 | do | 2 | 0.6 | 4 | 1.6 | 3.8 | 0.6 |
| 4 | do | 5 | 5 | 4 | 4.9 | 10.0 | 2.7 |
| 5 | do | 5 | 10 | 4 | 3.1 | 8.4 | 2.5 |
| 6 | do | 10 | 3 | 6 | 5.7 | 14.5 | 2.4 |
| 7 | do | 5 | 1.5 | 6 | 3.4 | 9.7 | 2.9 |
| 8 | Above 200 mesh activated carbon | 10 | 3 | 6 | 8.3 | 14.0 | 3.8 |
| 9 | 30-60 mesh silica gel | 10 | 3 | 6 | 3.2 | 13.5 | 3.0 |
| 10 | do | 10 | 1 | 6 | 1.0 | 4.8 | 0.6 |
| 11 | do | 10 | 10 | 6 | 4.1 | 19.3 | 2.5 |
| 12 | do | 5 | 3 | 6 | 2.4 | 7.4 | 2.2 |
| 13 | do | 2 | 3 | 6 | 2.2 | 5.1 | 1.6 |
| 14 | 30-60 mesh α-aluminia | 10 | 3 | 6 | 2.1 | 4.0 | 0.2 |
| 15 [1] | 30-60 mesh activated carbon | 10 | 3 | 6 | 3.8 | 8.7 | 2.4 |
| 16 [2] | do | 10 | 3 | 4 | 3.1 | 11.4 | 3.6 |
| 17 [3] | do | 10 | 3 | 4 | 6.0 | 18.5 | 3.3 |
| 18 | do | 10 | 3 | 4 | 5.2 | 11.8 | 3.6 |

[1] Reaction was conducted without lithium acetate.
[2] Reaction was conducted using sodium acetate instead of lithium acetate.
[3] Reaction was conducted using 3.7 moles of glacial acetic acid instead of glacial acetic acid-acetic anhydride mixture.

NOTE.—The amount of catalyst used is 11-12 g. The amounts of palladium and antimony supported are described in table.

Example 19

25 ml. of catalyst (15.0 g. of catalyst containing 11 mmoles of palladium metal and 3.3 mmoles of antimony metal supported on 30 to 60 meshes active carbon) prepared by the same procedure as in Example 1 were charged to a reaction tube (made of glass) of 12 mm. in inside diameter, and a glacial acetic acid-acetic anhydride (1:3 in weight) solution having dissolved sodium acetate in a weight concentration of 2 mmoles/l. was passed therethrough at the rate of 25 ml./hr. Butadiene and oxygen were passed with the reactor at the respective rate of 50 mmol/hr. to affect a continuous reaction at a reaction temperature of 80° C.

The products obtained per hour after the reaction was initiated are shown in Table II.

Example 20

The reaction was run in the same manner as in Example 19 except using a glacial acetic acid solution having dissolved sodium acetate in a concentration of 2 mmol/l. instead of the glacial acetic acid-acetic anhydride mixture solution. The results are shown in Table II.

Example 21

The reaction was run in the same manner as in Example 20 using 25 ml. of catalyst containing 5 mmoles of palladium metal and 5 mmoles of antimony metal supported and activated on carbon carrier. The results are shown in Table II.

Example 22

The reaction was run in the same manner as in Example 19 except using the catalyst used in Example 21 and passing glacial acetic acid at the rate of 25 ml./hr. The results are shown in Table II.

Example 23

0.8 mmole of palladium chloride and 0.8 mmole of antimony chloride were dissolved in 20 ml. of 12 N hydrochloric acid. 10 g. of 30 to 60 mesh activated carbon were added thereto and were evaporated slowly to dryness on a water bath and, thereafter, dried completely by passing a nitrogen gas stream at 200° C. for 2 hours. Next, the dried material was immersed in 1 N caustic soda aqueous solution and 5 ml. of 80% hydrozine aqueous solution were slowly added thereto while stirring. After allowing to stand at room temperature for 20 hours, an activated carbon supported catalyst was filtered out and the filtrate was washed with water until the washings tested were completely neutral. It was then dried in a water bath at 100° C. for 3 hours and, thereafter, dried in a nitrogen gas stream at 150° C. for 3 hours.

The reaction was run in the same manner as in Example 22 using the catalyst (containing 0.8 mmole of palladium metal and 0.8 mmole of antimony metal) so prepared. The results are shown in Table II.

Example 24

Palladium chloride and antimony chloride supported on activated carbon by the same procedure as in Example 23 were reduced in a hydrogen gas stream at 300° C. for 10 hours to prepare a catalyst. The reaction was run in the same manner as in Example 23 using the catalyst. The results are shown in Table II.

TABLE II

| Example No. | Mmol Pd | Mmol Sb | Total reaction time (hour) | Product (mmol/hr.) 3,4-DAB | t-1,4-DAB | c-1,4-DAB |
|---|---|---|---|---|---|---|
| 19 | 11 | 3.3 | 24 | 0.12 | 0.49 | 0.14 |
|  |  |  | 60 | 0.12 | 0.51 | 0.16 |
|  |  |  | 80 | 0.11 | 0.54 | 0.16 |
|  |  |  | 100 | 0.10 | 0.50 | 0.14 |
| 20 | 11 | 3.3 | 25 | 0.13 | 0.59 | 0.18 |
|  |  |  | 50 | 0.12 | 0.59 | 0.18 |
|  |  |  | 85 | 0.11 | 0.55 | 0.16 |
|  |  |  | 100 | 0.11 | 0.52 | 0.16 |
| 21 | 5 | 5 | 20 | 0.26 | 1.56 | 0.37 |
|  |  |  | 30 | 0.26 | 1.63 | 0.32 |
|  |  |  | 60 | 0.25 | 1.60 | 0.33 |
|  |  |  | 90 | 0.21 | 1.65 | 0.33 |
| 22 | 5 | 5 | 25 | 0.30 | 1.88 | 0.46 |
|  |  |  | 50 | 0.30 | 1.84 | 0.45 |
|  |  |  | 70 | 0.28 | 1.94 | 0.44 |
|  |  |  | 90 | 0.28 | 1.90 | 0.43 |
| 23 | 0.8 | 0.8 | 14 | 0.16 | 0.67 | 0.16 |
|  |  |  | 24 | 0.12 | 0.52 | 0.11 |
|  |  |  | 33 | 0.09 | 0.40 | 0.09 |
| 24 | 0.8 | 0.8 | 13 | 0.50 | 1.47 | 0.34 |
|  |  |  | 22 | 0.23 | 0.75 | 0.20 |
|  |  |  | 35 | 0.11 | 0.40 | 0.10 |

Example 25

A catalyst on activated carbon was prepared by the same procedure as in Example 1 using 25 mmole of palladium chloride and 25 mmole of bismuth nitrate and the reaction was run in the same manner as in Example 1 to obtain 3.0 mmoles of 3,4-DAB, 8.1 mmoles of t-1,4-DAB and 0.9 mmole of c-1,4-DAB.

Example 26

5 mmoles of palladium chloride and 5 mmoles of tellurium dioxide were dissolved in 40 ml. of 6 N hydrochloric acid and 10 g. of 20 to 50 mesh activated carbon were added thereto. The solution was evaporated slowly to dryness in a water bath. After further drying by passing a nitrogen gas stream at 150° C. for 2 hours, the material was reduced by passing a stream of nitrogen gas saturated with methanol at room temperature at the rate of 1 l./minute at 200° C. for 2 hours and further at 400° C. for 1 hour to prepare a catalyst.

This catalyst was admixed with 3.62 moles of glacial acetic acid and changed to an autoclave of 300 ml. in content volume, made of glass and provided with a thermometer, a stirrer and a gas inlet. Butadiene and oxygen were introduced there at respective rates of 55 mmoles/hour at 85° C. for 4 hours. After cooling, the product was filtered to remove the catalyst and the filtrate was concentrated to about 20 ml. under reduced pressure of 50 mm. Hg. The concentrate was subjected to gas chromatography to determine the quantity of diacetoxybutenes produced. The results are shown in Table III.

Examples 27 to 30

According to the method as described in Example 26, several supported catalysts of different composition and amounts of tellurium were prepared and the reaction was run in the same manner as in Example 26. The results are shown in Table III.

Examples 31 and 32

A catalyst was prepared by the method described in Example 26 except using selenium dioxide instead of tellurium dioxide, and the reaction was run in the same manner as in Example 26 using the catalyst. The results are shown in Table III.

Example 33

10 g. of 20 to 50 mesh activated carbon were heated for 6 hours under reflux, together with 100 ml. of 15% nitric acid aqueous solution. After allowing the mixture to cool, it was washed with water until the wash water tested neutral and, then dried at 80° C. under reduced pressure.

According to the method described in Example 26, 5 mmoles of palladium chloride and 0.75 mmole of tellurium dioxide were supported on the activated carbon. The catalyst was subjected to oxidation pretreatment and the reaction was run in the same manner as in Example 26 using the catalyst. The results are shown in Table III.

Example 34

2 mmoles of palladium nitrate and 0.3 mmole of tellurium dioxide were dissolved in 20 ml. of nitric acid of (60%, by weight in concentration). 4 g. of 20 to 50 mesh activated carbon was added thereto and the mixture was evaporated to dryness in a water bath. The dried material was then reduced by the method described in Example 26 to prepare a catalyst. Using the catalyst, the reaction was run in the same manner as in Example 26. The results are shown in Table III.

Example 35

2 mmoles of palladium chloride and 0.3 mmole of tellurium tetrachloride were dissolved in 20 ml. of 6 N hydrochloric acid 4 g. of 20 to 50 mesh activated carbon were added thereto. The catalyst was prepared according to the procedure as in Example 26. Using the catalyst, the reaction was run in the same manner as in Example 26. The results are shown in Table III.

Examples 37 to 44

Using the same catalyst as used in Example 27, the reaction was run under different amount of butadiene charged, reaction temperature, reaction time or partial pressure of oxygen. By altering the partial pressure of oxygen with nitrogen gas, so the oxygen in the gaseous phase was controlled to 10% in concentration. The results are shown in Table IV. The selectivity of diacetoxybutenes for reacted butadiene was above 96% and the amount of carbon dioxide produced was very slight.

TABLE IV

| Example No. | Butadiene charged, mmol | Partial pressure of oxygen, kg./cm.² | Reaction time, hr. | Reaction temperature, °C. | Conversion rate of butadiene, percent | Product (mmol) | | | |
|---|---|---|---|---|---|---|---|---|---|
| | | | | | | 3,4-DAB | 1,3-DAB | c-1,4-DAB | t-1,4-DAB |
| 36 | 203 | 1 | 1 | 80 | 11.6 | 2.79 | 0.17 | 2.56 | 16.92 |
| 37 | 196 | 2 | 1 | 80 | 13.6 | 3.00 | 0.39 | 2.83 | 19.24 |
| 38 | 166 | 3 | 1 | 80 | 22.5 | 4.10 | 0.54 | 4.35 | 27.78 |
| 39 | 213 | 4 | 1 | 80 | 19.3 | 4.71 | 0.42 | 4.37 | 29.98 |
| 40 | 209 | 2 | 1 | 100 | 27.8 | 4.77 | 3.45 | 4.75 | 32.59 |
| 41 | 207 | 2 | 1 | 60 | 5.9 | 1.42 | 0.22 | 1.45 | 8.56 |
| 42 | 196 | 2 | 1 | 90 | 24.3 | 5.32 | 0.46 | 4.63 | 34.81 |
| 43 | 187 | 2 | 2 | 80 | 31.0 | 6.60 | 0.53 | 5.58 | 43.14 |
| 44 | 192 | 2 | 4 | 80 | 37.3 | 4.57 | 0.34 | 7.98 | 55.67 |

Example 45

5 mmoles of palladium chloride were dissolved in 20 ml. of 6 N hydrochloric acid and 380 ml. of water were added thereto. 30 ml. of aqueous ammonium were added to this solution to prepare an aqueous solution of palladium ammine complex salt. 12 g. of 20 to 50 mesh activated carbon was subjected to oxidation pretreatment according to the method as descrbed in Example 33 and was immersed into this solution. After allowing to stand at room temperature for one week the solution was filtered, washed with water, and dried under reduced pressure in a water bath. It was then further dried in a nitrogen gas stream at 150° C. for 2 hours.

TABLE III

| Example No. | Carrier | | (Mmol) | | | Product (mmol) | | | |
|---|---|---|---|---|---|---|---|---|---|
| | Kind | G. | Pd | Te | Se | 3,4-DAB | 1,3-DAB | c-1,4-DAB | t-1,4-DAB |
| 26 | 20-50 mesh activated carbon | 10.0 | 5 | 5 | 0 | 1.61 | 0.93 | 2.75 | 7.40 |
| 27 | do | 10.0 | 5 | 1.5 | 0 | 6.41 | 1.52 | 5.26 | 38.30 |
| 28 | do | 10.0 | 5 | 0.75 | 0 | 7.36 | 00.97 | 4.20 | 42.58 |
| 29 | Spherical α-Al₂O₃ of 2 mm. in diameter | 10.0 | 5 | 0.75 | 0 | 0.20 | 0.43 | 0.06 | 1.32 |
| 30 | Above 200 mesh activated carbon | 4.0 | 5 | 0.75 | 0 | 5.08 | 0.62 | 10.69 | 40.99 |
| 31 | 20-50 mesh activated carbon | 10.0 | 5 | 0 | 1.5 | 2.27 | 1.17 | 20.3 | 16.00 |
| 32 | do | 10.0 | 5 | 0 | 0.75 | 2.04 | 1.30 | 1.94 | 14.11 |
| 33 | 20-50 mesh activated carbon treated with nitric acid | 10.0 | 5 | 0.75 | 0 | 8.70 | Trace | 43.30 | 66.40 |
| 34 | do | 4 | 2 | 0.3 | 0 | 9.29 | 0.16 | 15.02 | 70.66 |
| 35 | 20-50 mesh activated carbon | 4 | 2 | 0.3 | 0 | 3.25 | 0.30 | 2.74 | 21.25 |

Example 36

A catalyst, which contains 5 mmoles of palladium and 0.75 mmole of tellurium supported on 10 g. of activated carbon, prepared according to the method as described in Example 26 was charged together with 200 ml. of acetic acid into an autoclave of 300 ml. in content volume and provided with an induction rotating type of stirring means and, after replacing the atmosphere in the autoclave with nitrogen, 203 mmoles of butadiene were charged thereinto by distillation and then nitrogen was added until the total pressure was about 3 kg./cm.². The autoclave was heated to 80° C. and further nitrogen was pumped thereinto to elevate the total pressure to 9 kg./cm.². On the other hand, 100 kg./cm.² of oxygen were introduced into a pressure accumulator which was then connected to the autoclave through a constant pressure apparatus set to the pressure of 10 kg./cm.², and oxygen was supplied to the autoclave until the partial pressure was 1 kg./cm.². After the reaction was complete, the autoclave was quenched rapidly and, after filtering the catalyst from the content, the product was analyzed. The results are shown in Table IV.

1.8 mmoles of tellurium dioxide was dissolved in 10 ml. of 4 N hydrochloric acid and 30 ml. of aqueous ammonium and 30 ml. of water was added thereto. The palladium catalyst prepared previously was immersed in this solution and, after allowing to stand at room temperature for one week, was filtered, washed with water, dried under reduced pressure in a water bath and further dried in a nitrogen gas stream at 150° C. for 2 hours. Reduction reaction was effected in a hydrogen stream at 200° C. for 2 hours and further at 300° C. for 1 hour to prepare the catalyst. 25 ml. of catalyst (containing 3 mmoles of palladium and 0.9 mmole of tellurium) thus prepared was changed to a glass reaction tube 12 mm. I.D. Acetic acid was passed therethrough at the rate of 25 ml./hour and butadiene and oxygen was passed thereto at the respective rates of 50 mmoles/hr. to effect a continuous reaction at a reaction temperature of 80° C. The products obtained per hour are shown in Table V.

Example 46

A solution of 1.8 mmoles of tellurium dioxide dissolved in 10 ml. of 4 N hydrochloric acid was added to the aqueous solution of palladium ammine complex prepared according to the methods described in Example 45. 12 g. of activated carbon was immersed in the mixed solution, filtered, dried and reduced in the same manner as in Example 45 to prepare the catalyst. Using this catalyst the reaction was run in the same manner as in Example 45. The results are shown in Table V.

TABLE V

| Example No. | Mmol | | Total reaction time (hours) | Product (mmol/hr.) | | | |
|---|---|---|---|---|---|---|---|
| | Pd | Te | | 3,4-DAB | 1,3-DAB | c-1,4-DAB | t-1,4-DAB |
| 45 | 3 | 0.9 | 7 | 0.75 | 0.02 | 0.94 | 6.27 |
| | | | 15 | 0.56 | 0.02 | 0.72 | 4.29 |
| | | | 22 | 0.43 | 0.01 | 0.62 | 3.50 |
| 46 | 3 | 0.9 | 7 | 0.96 | 0.02 | 1.12 | 8.20 |
| | | | 14 | 0.67 | 0.01 | 0.90 | 5.95 |
| | | | 21 | 0.61 | 0.01 | 0.80 | 5.11 |
| | | | 29 | 0.48 | 0.01 | 0.68 | 4.08 |

Example 47

5 mmoles of palladium chloride, 5 mmoles of antimony trichloride and 1.5 mmoles of tellurium dioxide were dissolved in 40 ml. of 6 N hydrochloric acid, 10 g. of 20 to 50 mesh activated carbon were added thereto and dried slowly in a water bath. This was completely dried in a nitrogen gas stream at 150° C. for 2 hours and, thereafter, was reduced by passing nitrogen gas saturated with methanol at room temperature thereto at the rate of 1 l./minute at 200° C. for 2 hours and then at 400° for 1 hour to prepare a catalyst. This catalyst was admixed with 3.62 moles of glacial acetic acid into an autoclave 300 ml. in content volume, made of glass and provided with a thermometer, a stirrer and a gas inlet. Butadiene and oxygen were passed thereto at their respective rate of 55 mmoles per hour at 85° C., and reaction continued for 4 hours. After cooling, the reaction product was filtered to remove the catalyst and the filtrate was concentrated to about 20 ml. under a reduced pressure of 50 mm. Hg. The concentrate was subjected to gas chromatography to determine the diacetoxybutenes produced. A portion of the product was removed and the palladium dissolved was analyzed. The results are shown in Table VI.

Examples 48 to 53

According to the method described in Example 47 palladium chloride and one or two kinds of antimony trichloride, bismuth nitrate, tellurium dioxide and selenium dioxide were combined to prepare catalysts. The reaction was run in the same manner as in Example 47 using the catalysts. The results are shown in Table VI.

Examples 54 to 56

25 ml. of catalyst supported on 20 to 50 mesh carrier and containing 5 mmoles of palladium metal and 5 mmoles of at least one of antimony metal, tellurium metal and selenium metal according to the method as described in Example 47 were charged into a glass reaction tube 12 mm. I.D. and glacial acetic acid was passed therethrough at the rate of 25 ml./hr. Butadiene and oxygen were passed at the respective rates of 50 mmoles/hr. to continuously carry out reaction at a reaction temperature of 80° C.

The amount of product obtained per hour after a certain period of time after the reaction was initiated and the amount of palladium eluted to the product liquid are shown in Table VII.

TABLE VII

| Example No. | Metal on carrier (mmol) | | | | Total reaction time (hours) | Product (mmol/hr.) | | | 1,4-DAB/ 3,4-DAB +1,3-DAB | Amount of Pd eluted (mg./l. product liquid) |
|---|---|---|---|---|---|---|---|---|---|---|
| | Pd | Sb | Te | Se | | 3,4-DAB | 1,3-DAB | 1,4-DAB | | |
| 54 | 5 | 5 | 0 | 0 | 20 | 0.26 | 0.08 | 1.95 | 5.7 | 25 |
| | | | | | 50 | 0.24 | 0.08 | 2.29 | 7.1 | 22 |
| | | | | | 100 | 0.23 | 0.09 | 2.28 | 7.1 | 20 |
| 55 | 5 | 5 | 5 | 0 | 20 | 0.38 | 0.03 | 3.64 | 8.9 | ~0 |
| | | | | | 50 | 0.25 | 0.02 | 2.55 | 9.4 | ~0 |
| | | | | | 100 | 0.24 | 0.02 | 2.33 | 9.0 | ~0 |
| 56 | 5 | 5 | 0 | 5 | 10 | 0.07 | 0.01 | 0.58 | 7.3 | ~0 |
| | | | | | 20 | 0.07 | 0.01 | 0.58 | 7.3 | ~0 |

Having now fully described the invention, it will be apparent to one of ordinary skill in the art that many changes and modifications can be made thereto without departing from the spirit or scope of the invention as set forth herein. Accordingly, what is claimed as new and desired to be secured by Letters Patent is:

1. A process for the production of unsaturated diesters, which comprises reacting in a liquid phase a conjugated diene of the formula

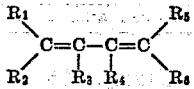

wherein $R_1$, $R_2$, $R_3$, $R_4$, $R_5$ and $R_6$ may be same or different and each represents hydrogen or an alkyl group having 1 to 6 carbon atoms, a carboxylic acid selected from the group consisting of aliphatic, aromatic and alicyclic carboxylic acid having 2 to 20 carbon atoms, and oxygen in the presence of a supported solid catalyst consisting essentially of elemental palladium and at least one element selected from the gorup consisting of antimony, bismuth, tellurium and selenium.

TABLE VI

| Example No. | Metal on carrier [1] (mmol) | | | | | Product (mmol) | | | 1,4-DAB/ 3,4-DAB +1,3-DAB | Amount of Pd eluted (mg./l. product liquid) |
|---|---|---|---|---|---|---|---|---|---|---|
| | Pd | Sb | Bi | Te | Se | 3,4-DAB | 1,3-DAB | 1,4-DAB | | |
| 47 | 5 | 5 | 0 | 1.5 | 0 | 3.2 | 0.3 | 20.0 | 5.7 | <0.5 |
| 48 | 5 | 5 | 0 | 0 | 0 | 4.6 | 0.3 | 12.7 | 2.6 | 28 |
| 49 | 5 | 0 | 5 | 0 | 0 | 2.9 | 0.2 | 9.0 | 2.9 | 6 |
| 50 | 5 | 1.5 | 0 | 0.75 | 0 | 4.0 | 0.7 | 27.1 | 5.8 | <0.5 |
| 51 | 5 | 0.75 | 0 | 0.75 | 0 | 3.0 | 0.6 | 21.1 | 5.9 | <0.5 |
| 52 | 5 | 5 | 0 | 0 | 1.5 | 3.3 | 0.5 | 15.8 | 4.2 | <0.5 |
| 53 | 5 | 0 | 5 | 1.5 | 0 | 2.8 | 0.2 | 9.9 | 3.3 | <0.5 |

[1] The amount of carrier used is 10 g. and the figures show the amount of metal supported thereon.

2. The process according to claim 1 in which the conjugated diene is butadiene, isoprene, 2,3-dimethylbutadiene or piperylene.

3. The process according to claim 1 in which the catalyst is prepared by supporting a palladium compound and at least one element selected from the group consisting of antimony compound, bismuth compound, tellurium compound and selenium compound on a carrier and then reducing said supported compounds with a reducing agent.

4. The process according to claim 3 in which the carrier is activated carbon.

5. The process according to claim 4 in which the activated carbon is treated with an oxidizing agent.

6. The process according to claim 1 in which the catalyst consists essentially of palladium and antimony.

7. The process according to claim 1 in which the catalyst consists essentially of palladium and bismuth.

8. The process according to claim 1 in which the catalyst consists essentially of palladium and tellurium.

9. The process according to claim 1 in which the catalyst consists essentially of palladium and selenium.

10. The process according to claim 1 in which the catalyst consists essentially of palladium, tellurium and antimony or bismuth.

11. The process according to claim 1 in which the catalyst consists essentially of palladium, selenium and antimony or bismuth.

12. The process according to claim 1 in which 0.1 to 20%, by weight, of palladium and at least one element selected from the group consisting of 0.03 to 30%, by weight, of antimony, 0.03 to 30%, by weight, of bismuth, 0.01 to 30%, by weight, of tellurium and 0.01 to 30%, by weight, of selenium are supported on the carrier.

13. The process according to claim 1 in which the catalyst consists essentially of palladium and 0.01 to 10 gram atom of antimony and bismuth in total per 1 gram atom of palladium.

14. The process according to claim 1 in which the catalyst consists essentially of palladium and 0.01 to 10 gram atom of tellurium and selenium in total per 1 gram atom of palladium.

15. The process according to claim 1 in which the catalyst consists essentially of palladium and 0.01 to 10 gram atom of antimony and bismuth in total per 1 gram atom of palladium and 0.01 to 10 gram atom of tellurium and selenium in total per 1 gram atom of palladium.

16. The process according to claim 1 in which the reaction temperature is within the range of 60 to 180° C.

17. A process for the production of diacetoxybutene, which comprises reacting butadiene, acetic acid and oxygen in the liquid phase in the presence of a supported solid catalyst consisting essentially of elemental palladium, and at least one element selected from antimony, bismuth, tellurium and selenium.

18. The process according to claim 17 in which the catalyst is prepared by supporting a palladium compound and at least one compound selected from an antimony compound, bismuth compound, tellurium compound and selenium compound, on a carrier and then reducing said supported compounds with a reducing agent.

19. The process according to claim 18 in which the carrier is activated carbon.

20. The process according to claim 19 in which activated carbon is treated with an oxidizing agent.

21. The process according to claim 20 in which the oxidizing agent is nitric acid.

22. The process according to claim 17 in which the catalyst consists essentially of palladium and tellurium.

23. The process according to claim 17 in which the catalyst consists essentially of palladium and selenium.

24. The process according to claim 17 in which the catalyst consists essentially of palladium, antimony and tellurium or selenium.

25. The process according to claim 17 in which 0.1 to 20%, by weight, of palladium and at least one member selected from the group consisting of 0.03 to 30%, by weight, of antimony, 0.03 to 30%, by weight, of bismuth 0.01 to 30%, by weight, of tellurium and 0.01 to 30%, by weight, of selenium are supported on the carrier.

26. The process according to claim 17 in which the catalyst consists essentially of palladium and 0.01 to 10 gram atom of antimony and bismuth in total per 1 gram atom of palladium.

27. The process according to claim 17 in which the catalyst consists essentially of palladium and 0.01 to 10 gram atom of tellurium and selenium in total per 1 gram atom of palladium.

28. The process according to claim 17 in which the catalyst consists essentially of palladium and 0.01 to 10 gram atom of antimony and bismuth in total per 1 gram atom palladium and 0.01 to 10 gram atom of tellurium and selenium in total per 1 gram atom of palladium.

29. The process according to claim 17 in which the reaction temperature is within the range of 60 to 180° C.

References Cited

UNITED STATES PATENTS

| | | | |
|---|---|---|---|
| 3,670,014 | 6/1972 | Fenholz et al. | 260—497 A |
| 3,671,577 | 6/1972 | Ono et al. | 260—497 A |

FOREIGN PATENTS

| | | | |
|---|---|---|---|
| 1,003,396 | 9/1965 | Great Britain | 260—497 A |
| 1,138,366 | 1/1969 | Great Britain | 260—497 A |
| 1,224,595 | 3/1971 | Great Britain | 260—475 N |

LORRAINE A. WEINBERGER, Primary Examiner

R. D. KELLY, Assistant Examiner

U.S. Cl. X.R.

260—410.6, 468 R, 476 R